United States Patent [19]

Daniels

[11] 4,110,930
[45] Sep. 5, 1978

[54] NON-TWISTING SPINNING LURE

[76] Inventor: Ronald Daniels, 115 Clover Ridge Ave., Fort Thomas, Ky. 41075

[21] Appl. No.: 778,669

[22] Filed: Mar. 17, 1977

[51] Int. Cl.² .............................................. A01K 85/00
[52] U.S. Cl. .................... 43/42.14; 43/42.17; 43/42.2; 43/42.39; 43/42.51; 43/43.13
[58] Field of Search ................... 43/42.14, 42.2, 42.19, 43/42.39, 42.28, 43.13, 42.13, 42.16, 42.17, 42.51; D22/27, 29

[56] References Cited

U.S. PATENT DOCUMENTS

| 1,073,199 | 9/1913 | Wilt | 43/42.14 |
| 1,522,451 | 1/1925 | Hayes | 43/42.19 |
| 1,836,650 | 12/1931 | Davenport | 43/42.2 X |
| 2,036,954 | 4/1936 | Murray | 43/42.39 X |
| 2,769,271 | 11/1956 | Smith | 43/43.13 |
| 2,940,204 | 6/1960 | Mehnert | 43/42.19 X |
| 3,488,877 | 1/1970 | Carabasse | 43/42.39 X |

Primary Examiner—Clifford D. Crowder

[57] ABSTRACT

A single main blade spinning type fishing lure, having the advantage of not twisting a fishing line attached thereto, during a retrieving action; the lure having a main blade at a fixed angle with the shaft; the main blade being also at an offset angle to the shaft and having a raised lip on its leading edge; a connecting wire being fixed in a lead, keel-shaped body having a twist opposite to that of the main blade; and also aft blades rotating opposite to the main blade.

3 Claims, 8 Drawing Figures

NON-TWISTING SPINNING LURE

This invention relates generally to fishing lures.

A principal object of the present invention is to provide a non-twisting spinning lure which is of single main blade spinning type, and which will not twist a fishing line, attached thereto, during a retrieving action.

Another object is to provide a non-twisting spinning lure which can be brought to the water surface, and as the main blade breaks the surface (called "buzzing"), the blade continues to rotate.

Yet another object is to provide a non-twisting spinning lure in which all blades rotate at any retrieve, slow or fast.

More specifically, an object of the invention is to provide a non-twisting spinning lure having a stationary body that does not rotate during retrieve.

Other objects are to provide a non-twisting spinning lure which is simple in design, inexpensive to manufacture, rugged in construction, easy to use and efficient in operation.

These and other objects will be readily evident upon a study of the following specification and the accompanying drawing, wherein.

Figure 1:
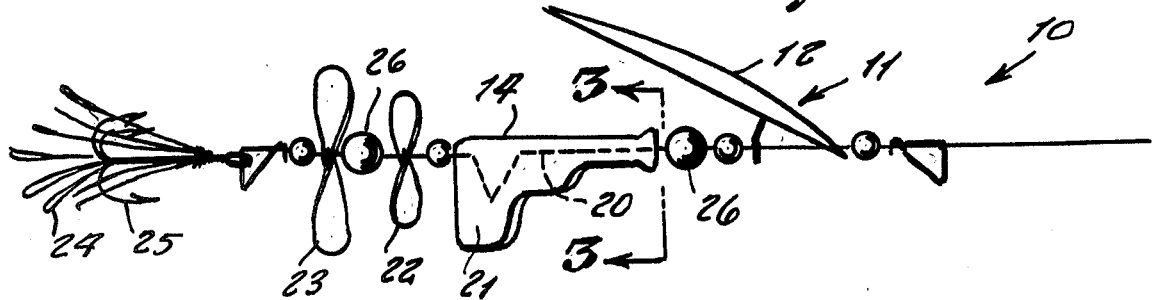
FIG. 1 is a side view of the lure invention.
Figure 2:
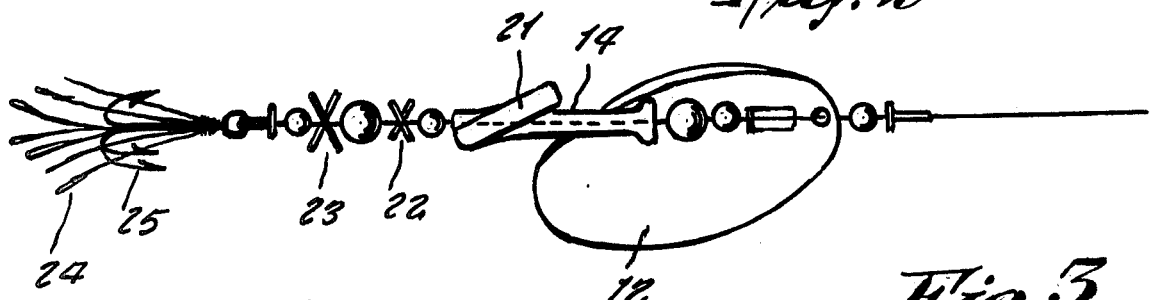
FIG. 2 is a bottom view thereof.

Referring now to the drawing in greater detail, the reference numeral 10 represents a non-twisting spinning lure according to the present invention which is of single main blade spinning type by including a propeller 11 having a single main blade 12.

The main blade is at a fixed angle with a shaft 13 which eliminates surface tension between the blade and a lead body 14 of the lure.

The main blade is also at an offset angle to the shaft 13, and also has a raised lip 15 to its leading edge. This allows the main blade to rotate in a given rotational direction, this direction thus being controlled.

Figure 4:
FIG. 4 is a top view of the main blade showing a hammered finish thereon.
Figure 3:
FIG. 3 is a view in direction 3—3 of FIG. 1 and illustrating the angular twist in the lead body.
Figure 7:
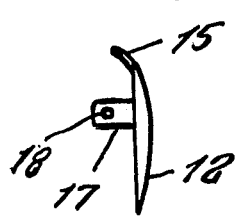
FIG. 7 is a front edge view of the main blade.
Figure 5:
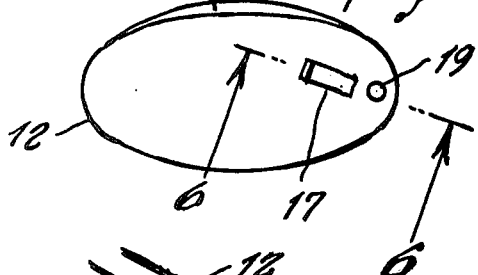
FIG. 5 is a bottom view of the main blade showing the underside lug.
Figure 6:
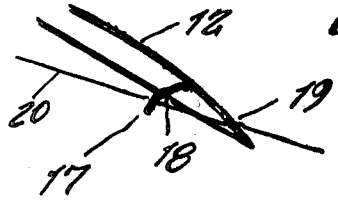
FIG. 6 is a cross section in direction 6—6 of FIG. 5.
Figure 8:
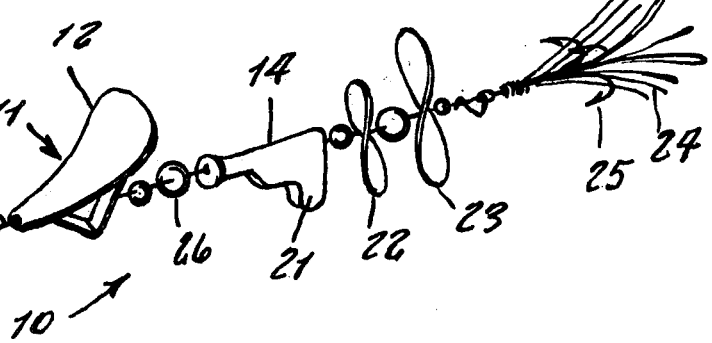
FIG. 8 is a perspective view of the invention.

As shown in FIGS. 4 and 5, the main blade is elliptical in shape and has a hammered finish 16 on only a top side thereof.

The main blade is shown to include a bracket arm 17 having opening 18 and the blade also including an opening 19 at its end; the openings receiving a connecting wire 20 therethrough.

The connecting wire is fixed within the lead body 14 so as to prevent the wire from rotating. The lead body is keel-shaped so as to form a large mass on one side that depends downwardly from the connecting wire. This locates the body center of gravity below the wire axis. A twist is made in the keel 21 of the body 14 which creates rotational or torque effect that is opposite to the main blade.

Aft propellers 22 and 23 of chrome brass are located on the connecting wire 20, the aft propellers rotating also opposite to the main blade so to also offset the rotational effect of the main blade.

A fly 24, hiding hooks 25, is attached on the trailing end of the connecting wire.

Beads 26 along the connecting wire separate the various components located therealong.

In operation, it is now evident that the fishing line will not twist during retrieve.

While various changes may be made in the detail construction, it is understood that such changes will be within the spirit and scope of the present invention as is defined by the appended claims.

What I now claim is:

1. A non-twisting spinning lure comprising in combination, a single main blade rotatably mounted on a shaft attached to a connecting wire fixedly secured in a lead body, said single main blade being at a fixed acute angle to said shaft and connected thereto by a bracket arm and an opening in an end of said blade, said single main blade having a raised lip on a leading edge thereof, said lead body having a keel portion and a center of gravity on one side of the longitudinal axis of said connecting wire, said keel portion of said lead body having a twist therein whereby rotational forces created by said single main blade and said lead body are in opposite directions.

2. The combination as set forth in claim 1 wherein a pair of aft propellers are mounted on said connecting wire and are shaped to rotate in a direction opposite to said single main blade.

3. The combination as set forth in claim 2, wherein a fly with hidden hooks is on an end of said connecting wire.

* * * * *